Jan. 21, 1941.  S. G. SAUNDERS ET AL  2,229,343
COMPOSITION OF MATTER AND PROCESS OF MAKING THE SAME
Filed Oct. 8, 1936

INVENTOR
SEYMOUR G. SAUNDERS AND
BY HARRY MORRISON.
ATTORNEY

Patented Jan. 21, 1941

2,229,343

UNITED STATES PATENT OFFICE

2,229,343

COMPOSITION OF MATTER AND PROCESS OF MAKING THE SAME

Seymour G. Saunders, Birmingham, and Harry Morrison, Detroit, Mich., assignors to Chrysler Corporation, Highland Park, Mich., a corporation of Delaware Application October 8, 1936, Serial No. 104,652

9 Claims. (Cl. 91—68)

This invention relates to an improved composition of matter and to the process for making the same.

One of the main objects of the invention is to provide an improved method for deriving from the residue of vegetable oil distillation (called vegetable oil pitch) commercially usable compositions which are susceptible to a large variety of applications.

Another object of the invention is to provide improved compositions of matter from treatment of vegetable oil distillation residues which, by suitable treatment and/or additions of suitable modifying and filling materials, are adapted for use as putty, adhesive, surface coating material, cloth impregnating agents and waterproofing agents, sound deadening and insulating materials, sealing material, welding primers, and food and beverage can liners.

A further object of the invention is to provide an improved process for converting vegetable oil distillation residues into a plastic mass having substantial resilient and yielding properties which can be applied or even molded while in unset state and which may be brought to a set state conveniently by promoting continuation of the reaction by which it is formed either at atmospheric or higher temperatures.

A still further object of the invention is to provide a process for converting modified vegetable oil distillation residues to a set state by initiating the setting reaction with ultra-violet light which acts to promote setting of such compositions to tasteless, odorless condition suitable for use as linings of food and vegetable receptacles, particularly cans.

Additional objects of the invention are to provide a beverage and food receptacle lining of this character which is resistant to both acids and alkali of foods and beverages and which will protect the walls of such containers from corrosion thereby, to provide a protective coating of this character which is particularly adapted for the coating of metal beer containers and which has a marked capacity for absorption of gases and fumes that are normally absorbed by charcoal linings of conventional beer kegs.

Other objects of the invention are to provide both air drying and baking coatings from vegetable oil distillation residues, and to provide coatings of this character which adhere tenaciously to wood, metal and the like, and which are sufficiently ductile to withstand chipping.

Illustrative embodiments of the invention are shown in the accompanying drawing, in which.

Figure 1:
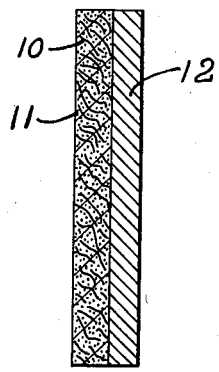
Fig. 1 is a sectional view diagrammatically showing an insulation panel embodying the invention.

Compositions having the foregoing properties can be made from properly treated and modified reaction products of either vegetable oil distillation residue and sulphur or vegetable oil distillation residue and red lead. Examples of suitable residues are cottonseed oil pitch, linseed oil pitch, and soya bean oil pitch. During the sulphur treatment of pitch of this character, from 3 to 30 parts of sulphur, by weight, are heated with 100 parts, by weight, of the residue, at temperatures ranging from 280° F. to 450° F. This heat treatment is preferably continued until the reacting mass thickens. The reaction products of vegetable oil distillation residues and red lead may also be used for the foregoing purpose. Such reactions are preferably conducted at from substantially 250° F. to 360° F. using, for example, from 94 to 99 parts, by weight, of a vegetable oil pitch and from 6 to 1 parts, by weight, of red lead. The temperature is preferably increased gradually from atmospheric temperature and may be continued for substantially 30 minutes.

For most purposes, and with both sulphur and red lead reactions, the heating is discontinued prior to the occurrence of a violent reaction so as to enable completion of the reaction after the resulting products have been applied. In the production of pitch derivatives for use as coating materials, such as adhesives, binders for sound and heat insulation panels and layers, impregnating and water proofing agents, welding primers and fruit and beverage receptacle linings, it is preferable to discontinue the heat promoted reaction before the reaction becomes violent and to provide for continuation of the reaction after application of the material or molding thereof. This is accomplished by heating the material after it has been applied or formed in its finally desired condition, either alone or in combination with fillers, such as asphaltum, rubber asbestos, fiber, wood flour, paper and the like.

The foregoing reaction products may then be prepared for use in diverse applications. They may be used without dilution or alteration as surface coating materials and binders or, if desired, the reaction products may be dissolved in a suitable solvent, such as petroleum or coal tar distillates, for use in such applications. Solvents comprising naphtha, benzol or toluol are preferred.

Coating and binding material can be brought to a set condition by heating or baking operations conducted preferably at from 280° F. to 450° F., although application of lower temperatures for longer periods of time have proved successful. When such materials are applied to metal and heated to a set condition, it is found that the resulting product forms a bond with the metal that is comparable in character to a rubber and metal vulcanized bond.

Air setting materials of this kind may be produced by the addition of suitable driers, such as Japan, cobalt, or manganese driers. The driers take the place of the final heat treatment and promote setting of the products resulting from the incomplete reaction of either sulphur or red lead with vegetable oil distillation residues. If the air drying product is to be stored in containers for a period of time before using, the final setting can be delayed until after application of the material by adding an anti-oxidant, such as diethylamine or suitable low boiling amine compounds.

Putty and plastic wood can be made by incorporating a filler, such as asphalt, in solutions or in the undiluted reaction products which may also include the foregoing modifying agents for rendering them air drying. The composition is also particularly useful in the manufacture of sound and insulating panels and board. In this use of the product, illustrated in Fig. 1, a filler 10 comprising fibrous material, asphalt, or both, may be incorporated in a binder 11 comprising either a solution or undiluted reaction products and the mixture may then be applied on compressed paper board 12 or similar material, and brought to set condition by the application of heat or air drying. The reaction products may be brought to a solid state by prolonged reaction and then ground to provide fillers for any of the foregoing purposes. Solutions of or undiluted reaction products provide excellent welding primers for they withstand the welding heats, particularly of spot welding process and do not foul the metal or otherwise prevent proper fusion thereof during welding. The heat applied on the metal between adjacent welded areas helps to convert the products to set condition, thereby sealing the welded joint.

Figure 2:
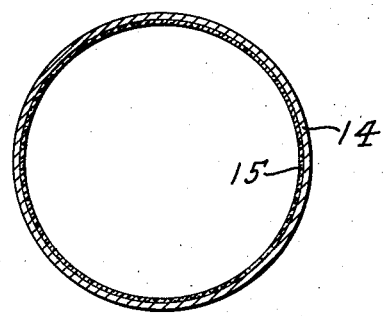
Fig. 2 is a sectional view diagrammatically showing a beverage can having a lining embodying the invention.

In order to facilitate successful use of coating materials as linings of food and beverage cans or containers, it is essential that the lining material be devoid of taste and odor and that it will withstand food contained alkali and acid reactions. It has been found that these requirements are well satisfied by the coating resulting from solutions of incomplete reaction products of vegetable oil pitch and either sulphur or red lead, which have been brought to a set condition by initiating the drying or completing reaction by exposing the coating to ultra-violet light. Although the exact action of ultra-violet light has not been ascertained, it has been found that the resulting coating sets rapidly and is free from objectionable taste and odor. In Fig. 2 is illustrated a section of a can 14 having a coating 15 of the foregoing nature as its internal surface.

Although but several specific embodiments of the invention are herein shown and described, it will be understood that various changes in the ingredients of the composition of matter and in the steps of the process of compounding thereof may be made without departing from the spirit of the invention.

What we claim is:

1. A container for foods, beverages and the like comprising a main body portion, and a substantially tasteless and odorless coating on the internal surfaces of the latter comprising insitus completed reaction products of partially reacted vegetable oil distillation residue and a reacting agent selected from the group of agents consisting of sulphur and red lead, the insitus reaction having been initiated by ultra-violet light.

2. A container for foods, beverages and the like comprising a main body portion, and a substantially tasteless and odorless coating on the internal surfaces of the latter comprising ultra-violet light initiated insitus completed reaction products of partially reacted sulphur and a vegetable oil distillation residue.

3. In a container for foods, beverages and the like; a tasteless and odorless coating comprising ultra-violet light initiated insitus completed reaction products of partially reacted red lead and a vegetable oil distillation residue.

4. In the manufacture of containers for foods, beverages and the like, the method of forming a substantially tasteless and odorless coating on a surface of such containers which comprises applying on said surface a solution of products of a partial reaction of a vegetable oil distillation residue and a reacting agent selected from the group of agents consisting of sulphur and red lead, and substantially completing the reaction between said residue and said agent insitus on said article.

5. In the manufacture of containers for foods, beverages and the like, the method of forming a substantially tasteless and odorless coating on a surface of such containers which comprises applying on said surface a solution of products of a partial reaction of a vegetable oil distillation residue and a reacting agent selected from the group of agents consisting of sulphur and red lead, and exposing said products to ultra-violet light to initiate further reaction between said residue and said agent.

6. In the manufacture of containers for foods, beverages and the like, the method of forming a substantially tasteless and odorless coating on a surface of such containers which comprises applying on said surface a solution of products of a partial reaction of a vegetable oil distillation residue and sulphur, and substantially completing the reaction between said residue and sulphur insitus on said article.

7. The method of coating a surface of an article which consists in applying on said surface a solution of products of a partial reaction of a vegetable oil distillation residue and red lead, and substantially completing the reaction between said residue and red lead insitus on said article.

8. In the manufacture of containers for foods, beverages and the like, the method of forming a substantially tasteless and odorless coating on a surface of such containers which comprises applying on said surface a solution of products of a partial reaction of a vegetable oil distillation residue and sulphur, and exposing said products to ultra-violet light to initiate further reaction between said residue and said sulphur.

9. The method of coating a surface of an article which consists in applying on said surface a solution of products of a partial reaction of a vegetable oil distillation residue and red lead, and exposing said products to ultra-violet light to initiate further reaction between said residue and said red lead.

SEYMOUR G. SAUNDERS.
HARRY MORRISON.